United States Patent [19]

Ammon et al.

[11] Patent Number: 5,018,052

[45] Date of Patent: May 21, 1991

[54] CABLE MANAGEMENT APPARATUS FOR A COMPUTER WORKSTATION HOUSING

[75] Inventors: James G. Ammon, San Jose; Philip G. Yurkonis, Campbell; Alfred Lockwood, Palo Alto, all of Calif.

[73] Assignee: Sun Microsystems, Inc., Mountain View, Calif.

[21] Appl. No.: 461,992

[22] Filed: Jan. 8, 1990

[51] Int. Cl.⁵ .................. H02B 1/20; H05K 5/00; G06F 1/00
[52] U.S. Cl. .................. 361/428; 361/383; 361/390; 361/395; 364/708
[58] Field of Search .............. 16/DIG. 13, 231, 232, 16/265, 266; 174/16.1, 68.3, 101; 361/338, 340, 342, 380, 383, 391, 393, 394, 395, 428, 429; 364/708

[56] References Cited

U.S. PATENT DOCUMENTS

| | | | |
|---|---|---|---|
| 4,584,739 | 4/1986 | Könen | 16/266 |
| 4,589,449 | 5/1986 | Bromwell | 174/101 |
| 4,748,540 | 5/1988 | Henneberg et al. | 361/383 |
| 4,922,382 | 5/1990 | Hobbins | 361/394 |

FOREIGN PATENT DOCUMENTS 3335884 4/1985 Fed. Rep. of Germany ...... 174/101

*Primary Examiner*—Leo P. Bicard
*Assistant Examiner*—Michael W. Phillips
*Attorney, Agent, or Firm*—Blakely Sokoloff Taylor & Zafman

[57] ABSTRACT

A cable management apparatus for a computer workstation housing is disclosed. The cable management apparatus includes an outer surface having at least one hinge element and an associated snap element. The cable management apparatus also includes at least one rigid member having first and second ends, the first end being attachable to the snap element and the second end being attachable to the hinge element. The rigid member cooperates with the outer surface to form a space therebetween for securement of cables exiting the computer workstation housing.

12 Claims, 3 Drawing Sheets

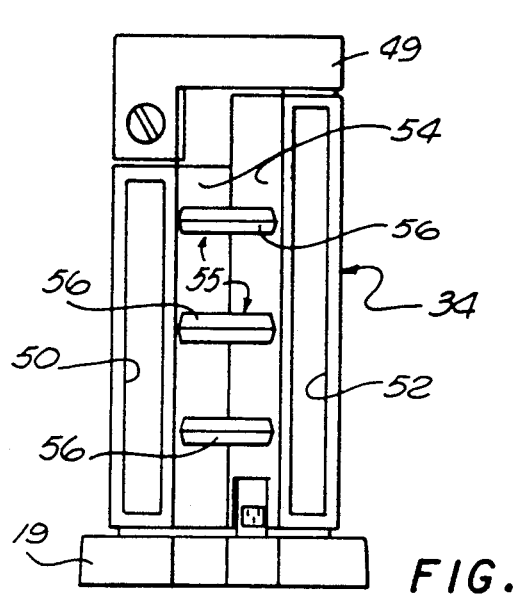
FIG. 6
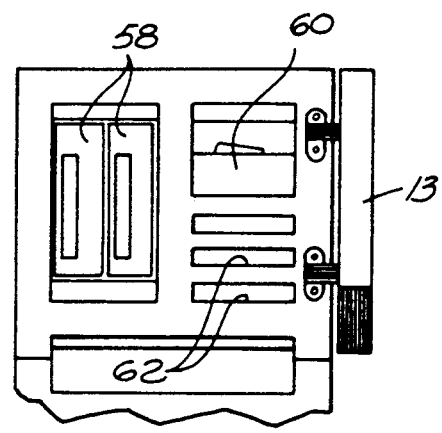
FIG. 7
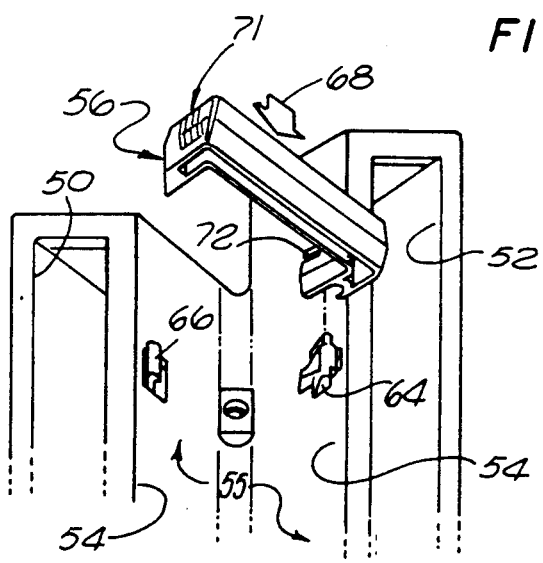
FIG. 8
FIG. 9
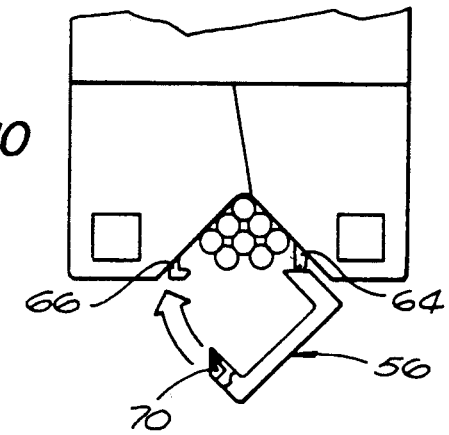
FIG. 10

CABLE MANAGEMENT APPARATUS FOR A COMPUTER WORKSTATION HOUSING

BACKGROUND OF THE INVENTION

1. Field of the Invention

The present invention relates to computer housings and more particularly to deskside computer housings which use plug-in circuit boards.

2. Related Applications

This application is related to copending U.S. patent application Ser. No. 07/462,099, filed Jan. 8, 1990, and entitled "DESKSIDE COMPUTER WORKSTATION HOUSING."

3. Description of the Related Art

Computer housings for desktop computers have been known in the art to contain both horizontally and vertically oriented slots for insertion of plug-in circuit boards.

However, heretofore, deskside, stand-alone computers have used housings which only receive horizontally installed boards. Typically, plug-in boards are installed or inserted into the back of the housing in a horizontal direction. This orientation makes access to boards difficult because the deskside computer housing is typically positioned against a wall under a desk. Furthermore, vulnerable parts of the cabling (strain relief and connection points to the plug-in boards) face rearward. These vulnerable parts are often damaged when the housing is pushed against a wall or furniture—a common cause of equipment failure. Additionally, to engage the plug-in board with the mother board, the plug-in board must be pushed in sideways, thus likely causing the unit to roll away.

Typical deskside computer systems presently used have aircooling mechanisms in which air is passed through the housing from top to bottom, bottom to top, front to sides or any other combination thereof. However, the use of horizontally installed boards precludes the ability to pass cooling air from the top of the housing to the bottom, which is more efficient, because the air can travel in a straighter path than the above-mentioned cases. Additionally, the use of vents on the top or bottom of the housing allow dust or other foreign matter to more easily enter the machine.

SUMMARY OF THE INVENTION

The present invention is a cable management apparatus for a computer workstation housing. The cable management apparatus includes an outer surface having at least one hinge element and an associated catch element. The cable management apparatus also includes at least one rigid member having first and second ends, the first end being attachable to the hinge element and the second end being snapped to the catch element. The rigid member cooperates with the outer surface to form a space therebetween for securement of cables exiting the computer workstation housing.

Preferably, cable management apparatus comprises a plurality of rigid members which are vertically spaced along a V-shaped trough formed on an outer rear surface of the housing. The trough is adapted to receive the cables. The user can easily route and secure the cables exiting the machine by laying them in the trough and closing the rigid elements. Removal of the cables is accomplished by simply unsnapping and pivoting to an open position the rigid members and lifting the cables out of the trough. The rigid members preferably extend beyond the rear surface of the computer workstation housing thus ensuring that the computer workstation housing has adequate space behind it, which protects the cables from being crushed and allows air to freely exit the rear surface.

BRIEF DESCRIPTION OF THE DRAWINGS

FIG. 6 is a rear elevational view of the plenum of the present invention.

FIG. 7 is a view of the front of the computer housing with the front door open.

FIG. 8 is a partial front perspective of the plenum of the computer housing of the present invention.

FIG. 9 is a front elevational view of a retaining member of the present invention looking side its ends.

FIG. 10 is a top view of the plenum of the computer housing.

The same elements or parts throughout the figures of the drawings are designated by the same reference characters.

DETAILED DESCRIPTION OF THE INVENTION

Figure 1:
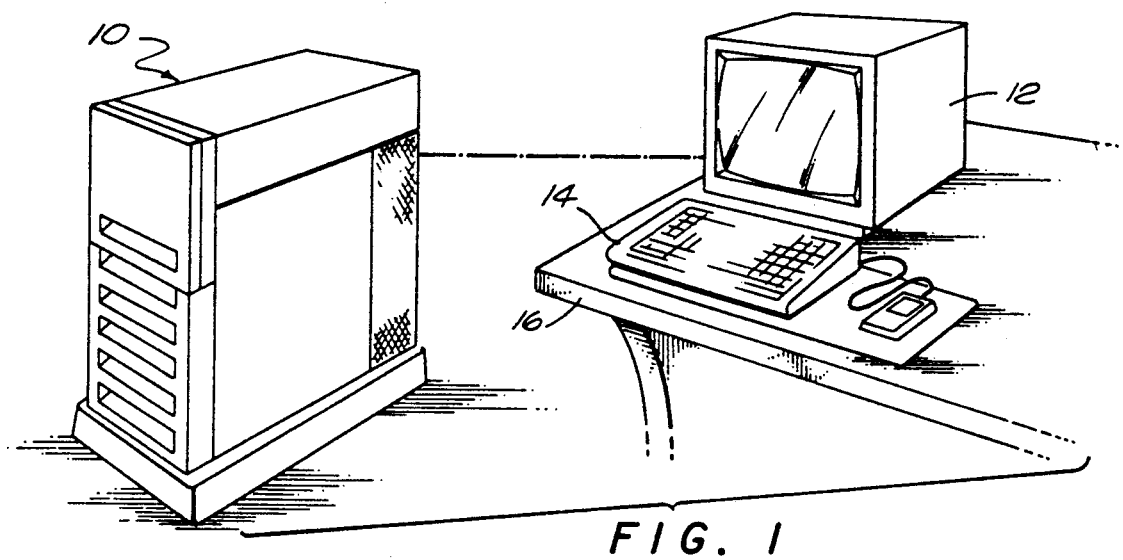
FIG. 1 illustrates a perspective view of the computer workstation housing of the present invention in conjunction with a desktop display monitor and keyboard.

Referring to the drawings and the characters of reference marked thereon, the computer workstation housing of the present invention is shown designated generally as 10. The computer workstation housing 10 is shown in proximity to a computer controlled display device 12 and associated keyboard 14. The computer workstation housing 10 is shown to the side of the desk 16; however, such computer workstation housings are often positioned against the wall underneath the desk. As shown in this figure, when fully assembled, the computer workstation housing includes numerous covers so that when fully assembled the covers make up a computer workstation housing 10 which is substantially rectangular.

Figure 2:
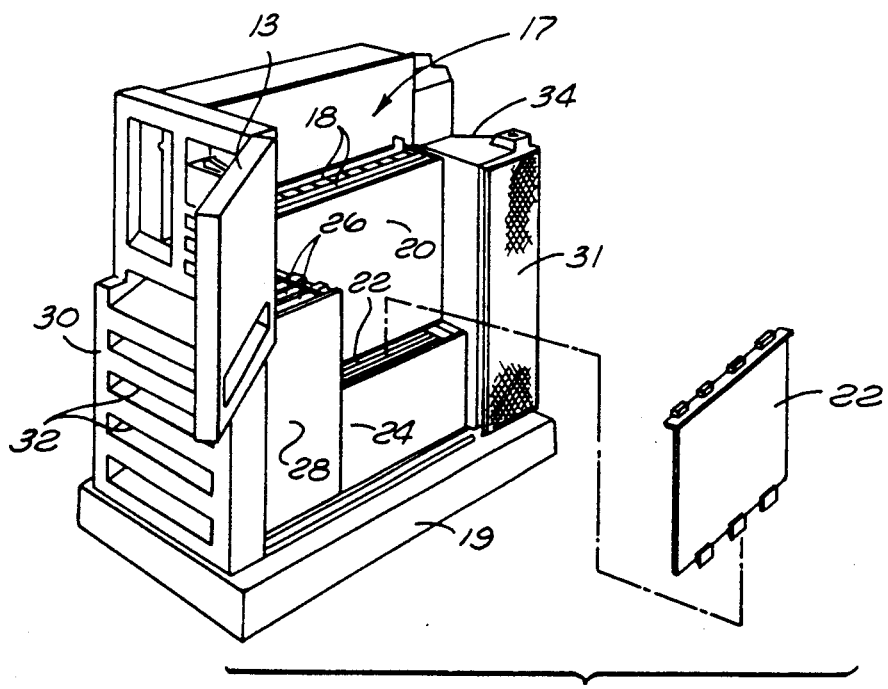
FIG. 2 is a front perspective view of the deskside computer workstation housing with the front door opened and the side and top covers removed.

Referring now to FIG. 2, the computer workstation housing 10 is illustrated with covers removed to expose a frame assembly 17 having a stepped top surface having vertically oriented slots formed therein adapted for insertion of plug-in circuit boards, an example of such a circuit board designated 22. The frame assembly 17 is supported by a base 19.

Figure 3:
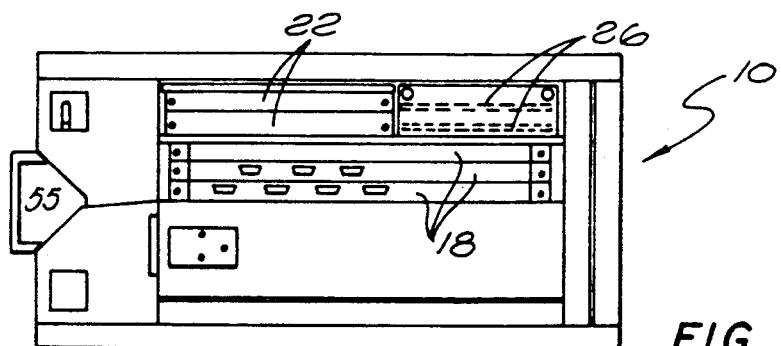
FIG. 3 is a top view of the workstation housing with the top and board side cover removed.

Referring now to FIGS. 2 and 3, a top view of the computer workstation housing 10 is illustrated. Three 9-U circuit cards 18 ("U" is a VME bus standard representative of the size of the card) are positioned along a centrally disposed step 20. Two 6-U cards 22 are disposed on lower step 24, and two memory expansion cards 26 are disposed on step 28.

Referring again to FIG. 2, the computer workstation housing 10 includes a front plastic bezel 30 with a plurality of horizontally disposed slots 32 for the introduction of cooling air. Computer workstation housing 10 also includes a rear plenum 34 which has various slots for allowing the exiting of cooling air, as will be described below.

Figure 4:
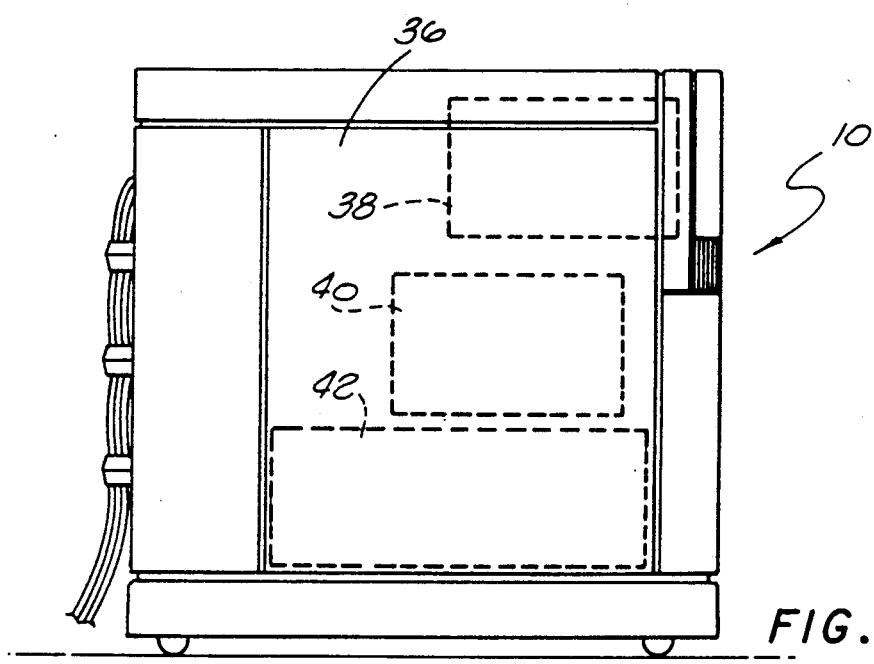
FIG. 4 is a left side view of the computer housing showing various components in phantom.

Referring now to FIG. 4, the left side of the computer workstation housing 10 is illustrated. Disposed beneath the side access cover 36 is an optional tape or hard drive 38, optional hard drive 40, and a power supply 42.

Figure 5:
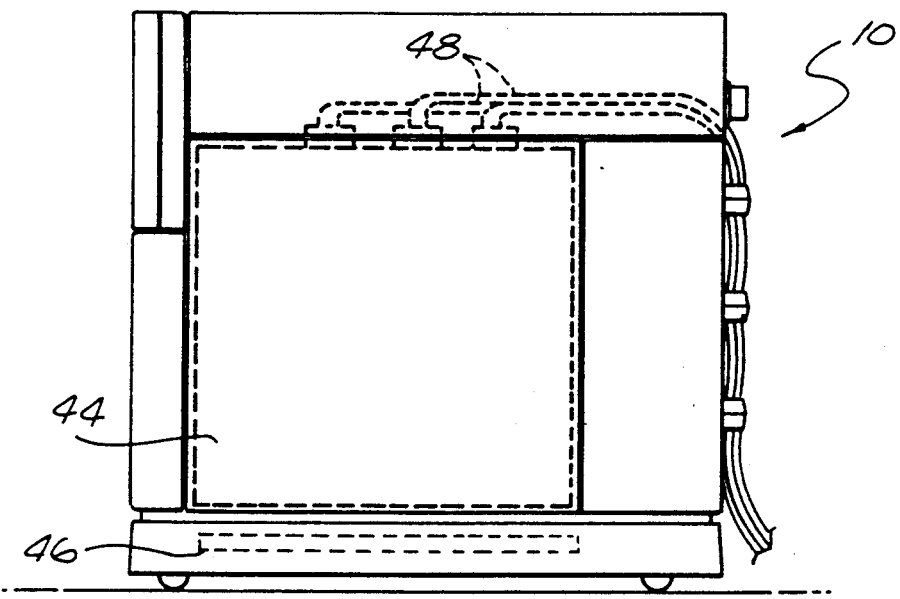
FIG. 5 is a right side view illustrating plug-in boards and cables in partial phantom.

Referring now to FIG. 5, a right side view of the computer workstation housing 10 is illustrated. The side access cover 44 provides access for the memory expansion cards 26 and the 6-U cards 22. The circuit boards plug into the mother board 46 shown in phantom. Cables 48 extend from the top of the circuit boards and are directed toward the rear of the housing. At this point the cables 48 spill down the rear of the housing, as will be described in detail below.

Referring now to FIG. 6, the plastic rear plenum 34 is illustrated in position between cover 49 and base 19. The plenum 34 provides the novel cable management abilities of the present invention. The plenum 34 includes vertical slots or exit vents 50, 52. The exit vents 50, 52 cooperate with entrance vents 32 to allow effective front to rear cooling. The rear plenum also includes side perforation 31 (FIG. 2) to assit in the exit of cooling air. Disposed between vents 50, 52 are angularly disposed sides 54 which form a V-shaped trough 55. The V-shaped trough 55 is centered in the rear surface.

The cable management apparatus includes vertically spaced rigid members 56 which retain the cables as the cables descend down the outer rear surface of the computer workstation housing 10.

Referring now to FIG. 7, the upper front portion of the computer workstation housing 10 is illustrated, the front door 13 being shown in an open position. The front portion includes drives 58, power switch 60 and air intake vents 62.

Referring now to FIG. 8, the retaining mechanism for the cable management apparatus of the present invention is illustrated. A hinge element 64 is fixed to one side 54 of the trough and an associated catch element 66 is located at the same elevation as the hinge element 64 but on the other side of the trough.

Referring now to FIG. 9, it can be seen that the rigid member 56 includes a restraining tab 67 on one end which cooperates with hinge element 64 on the trough 54. As shown in FIg. 8, the rigid member 56 may be inserted onto the hinge element 64 from the top as indicated by arrow 68, a hinging action resulting. The rigid member 56 may only be inserted when the rigid member is in the "open" orientation. That is, when the rigid member is attached and a hinging action results, the hinge is in the open position. Once the rigid member 56 is attached and closed, it can not be pulled upward off the hinge.

As illustrated in FIG. 10, it may be seen that the other end of the rigid member 56 includes an interior snap 70. The interior snap cooperates with snap element 66 to allow the rigid member 56 to snap into position. To release the snap element end of the rigid member 56, a compressive force may be applied to the serrated surface 71 of the rigid member to disengage the snap 70 from the catch 66. Thus, the rigid member 56 may be opened to allow insertion or removal of cables.

Referring again to FIG. 8, it may be seen that the end of the rigid member 56 which contains the restraining tab 67 has a slit 72. The slit provides sufficient flexibility to the portion of the rigid member 56 that contains the restraining tab 67 to allow the rigid member 56 to be pulled off the hinge element without damaging the apparatus. In addition, if the rigid member is forced to an overextended open position (which may occur from an inadvertent force due to someone pushing against the rigid member when the rigid member is in an open position), the rigid member will not break due to the force, but will pop-off cleanly without breakage.

By combining the hinge with a positive snap, there is little chance of the rigid member 56 accidently falling off. It cannot be removed when the rigid member is snapped shut. The rigid member is removed by placing the rigid mamber in the open position and pulling up.

Obviously, many modifications and variations of the present ivnention are possible in light of the above teachings. It is therefore to be understood that, within the scope of the appended claims, the invention may be practiced otherwise than as specifically described.

What is claimed and desired to be secured by Letters Patent of the United States is:

1. A cable management apparatus for a computer workstation housing, comprising:
a cable trough disposed in an outer surface of said housing, said trough being formed by indenting a portion of said housing such that said trough is below said outer surface of said housing, said trough having at least one hinge element and an associated catch element coupled thereto; and
at least one rigid member having first and second ends, said first end removably coupled to said catch element, said second end removably coupled to said hinge element, said rigid member cooperating with said outer surface to form a space therebetween and secure cables exiting the computer station housing.

2. The cable management apparatus of claim 1 wherein said rigid member is substantially U-shaped.

3. The cable management apparatus of claim 2 wherein said second end includes a restaining tab for engaging said hinge element and thereby locking said rigid member into a hinged relationship with said computer workstation housing.

4. The cable management apparatus of claim 3 wherein said restraining tab is located on a bendable portion of said second end separated by the remainder of said second end by a slit, wherein normal removal is accomplished by pulling off the rigid member from the hinge element, and the slit providing sufficient flexibility to said bendable portion to allow the rigid member to be popped-off the hinge element without damaging the cable management apparatus when the rigid member is forced into an overextended open position.

5. The cable management apparatus of claim 4 wherein said first end includes a snap for securing said first end into engagement with said catch element.

6. The cable management apparatus of claim 1 including a plurality of said rigid members, each rigid member being U-shaped.

7. The cable management apparatus of claim 1 wherein said trough receives said cables, said hinge elements and catch elements being vertically spaced along said trough.

8. The cable management apparatus of claim 1 wherein said trough is disposed in a rear surface of said computer workstation housing, said rigid members extending beyond the rear surface so as to serve as bumpers for said computer workstation.

9. The cable management apparatus of claim 8 wherein said trough is V-shaped.

10. The cable management apparatus of claim 9 wherein said V-shaped trough is centered in said rear surface, other sections of said rear surface containing vents to provide the exiting of cooling air to pass from front to rear.

11. A cable management apparatus for a computer workstation housing, comprising:
   (a) a trough formed on an outer surface of said housing by indenting a portion of said housing such that said trough is below an outer surface of said housing, said trough receiving cables exiting said computer workstation; and
   (b) retaining means removably secured to said housing for securing said cables within said trough.

12. The cable management apparatus of claim 11 wherein said retaining means includes at least one removably retainer hingedly connected to said housing.

* * * * *

UNITED STATES PATENT AND TRADEMARK OFFICE
CERTIFICATE OF CORRECTION

PATENT NO. : 5,018,052
DATED : May 21, 1991
INVENTOR(S) : Ammon et al.

It is certified that error appears in the above-identified patent and that said Letters Patent is hereby corrected as shown below:

Title page, after item [56], across from Primary Examiner,
In column 2 of the title page, please delete " Bicard " and insert -- Picard --.

In column 2 at line 47, please delete " housing " and insert -- housing 10 --.

In column 3 at line 46, please delete " FIg. " and insert -- FIG. --.

In column 6, claim 12 at line 7-8, please delete " removably retainer " and insert -- retainer removably --.

Signed and Sealed this

Sixth Day of May, 1997

*Attest:*

*Attesting Officer*

BRUCE LEHMAN

Commissioner of Patents and Trademarks